United States Patent [19]

Kamauchi et al.

[11] Patent Number: 5,538,814
[45] Date of Patent: Jul. 23, 1996

[54] LITHIUM SECONDARY BATTERY

[75] Inventors: Masahiro Kamauchi; Hiroshi Soejima; Shuji Kubota; Kouzou Sasaki, all of Amagasaki, Japan

[73] Assignee: Mitsubishi Cable Industries, Ltd., Amagasaki, Japan

[21] Appl. No.: 374,998

[22] Filed: Jan. 18, 1995

Related U.S. Application Data

[63] Continuation of Ser. No. 61,240, May 17, 1993, abandoned.

[30] Foreign Application Priority Data

| May 18, 1992 | [JP] | Japan | 4-124594 |
| Aug. 21, 1992 | [JP] | Japan | 4-223068 |
| Sep. 28, 1992 | [JP] | Japan | 4-258537 |
| Oct. 9, 1992 | [JP] | Japan | 4-271944 |
| Oct. 9, 1992 | [JP] | Japan | 4-271945 |

[51] Int. Cl.⁶ ............................. H01M 4/48
[52] U.S. Cl. ............................. 429/218; 429/194
[58] Field of Search ............................. 429/218, 194

[56] References Cited

U.S. PATENT DOCUMENTS

| 3,736,184 | 5/1973 | Dey et al. | |
| 4,223,080 | 9/1980 | Auborn | 429/194 |
| 4,751,158 | 6/1988 | Uchiyama et al. | 429/194 |
| 5,187,035 | 2/1993 | Miyabayahi et al. | 429/194 |
| 5,196,278 | 3/1993 | Idota | 429/218 |
| 5,246,796 | 9/1993 | Nagamine et al. | 429/194 |
| 5,286,582 | 2/1994 | Tahara et al. | 429/218 |

FOREIGN PATENT DOCUMENTS

| 0501187 | 9/1992 | European Pat. Off. |
| 0014931 | 9/1980 | France |
| 63-187571 | 8/1988 | Japan |
| 4-056064 | 2/1992 | Japan |

OTHER PUBLICATIONS

Journal of Power Sources, vol. 40, No. 3, Dec. 15, 1992, pp. 347–353 "Synthesis of $LiCoO_2$ from cobalt–organic acid complexes and its electrode behaviour in a lithium secondary battery".

Primary Examiner—Prince Willis, Jr.
Assistant Examiner—M. Nuzzolillo
Attorney, Agent, or Firm—Varndell Legal Group

[57] ABSTRACT

A lithium secondary battery comprising a positive electrode composed of a positive electrode active material comprising at least one member selected from the group consisting of lithium phosphate, lithium-cobalt phosphate, cobalt oxide, and lithium-cobalt oxide, such that the molar ratio of cobalt:phosphorus: lithium is more than 0.1:more than 0.2:1, a negative electrode, and an electrolyte. The lithium secondary battery of the invention has high energy density leading to high discharge capacity, high electromotive force, and high discharge voltage, and excellent cycle properties.

14 Claims, 5 Drawing Sheets

LITHIUM SECONDARY BATTERY

This application is a continuation of Ser. No. 08/061,240, filed May 17, 1993, now abandoned.

TECHNICAL FIELD OF THE INVENTION

The present invention relates to a positive electrode including a positive electrode active material of high energy density favorably used for a lithium secondary battery, and also to a lithium secondary battery with such a positive electrode, which has high energy density leading to high discharge capacity, high electromotive force, and high discharge voltage, and excellent cycle properties.

BACKGROUND OF THE INVENTION

Properties generally required of a secondary battery include (1) high energy density, (2) high power density, (3) low self-discharge rate, (4) reasonable cost, (5) high energy efficiency, and (6) long cycle life (a number of charge and discharge repetition).

Various materials for positive and negative electrodes have been studied and examined for the development of an improved secondary battery with such properties. A lithium secondary battery is known as a high energy density battery having various advantages such as wide applicable temperature range, stable discharge voltage, and very low self-discharge rate. $LiCoO_2$ having high electromotive force has been proposed as a positive electrode active material for such a high energy density battery (see K. Mizushima et al., MAT. Res. Bull., 15, 783 (1980)). Also, part of Co in $LiCoO_2$ was substituted by a transition metal, for example, Ni for further improvement [see T. Ohzuku et al. Chemistry Express, 5, 733 (1990)].

When $LiCoO_2$ oxide is used as a positive electrode active material, a lithium secondary battery including same has a small discharge capacity and poor cycle properties, thus resulting in prominent capacity degradation. On the other hand, when another oxide with part of Co in $LiCoO_2$ substituted by a transition metal is used as a positive electrode active material, a lithium secondary battery including same has larger discharge capacity but is lower in discharge voltage than that with $LiCoO_2$. The lower discharge voltage is disadvantageous in obtaining a high energy density battery.

From the foregoing, it is apparent that a lithium secondary battery including either an $LiCoO_2$ oxide or an oxide with part of Co in $LiCoO_2$ substituted by a transition metal as a positive electrode active material still has low energy density and poor cycle properties and does not fulfill the requirements in the market.

Another oxide having multi-layer structure and represented by the formula $A_xB_yC_zD_wO_2$ wherein A is at least one alkali metal, B is a transition metal, C is at least one of Al, In, and Sn; D is at least one of (a) an alkali metal other than A, (b) a transition metal other than B, (c) a IIa group element, and (d) a IIIb, IVb, Vb, or VIb group element of the second through sixth periodic number other than Al, In, Sn, C, N, and O; and x, y, z, and w are respectively $0.05 \leq x \leq 1.10$, $0.85 \leq y \leq 1.00$, $0.001 \leq z \leq 0.10$, and $0.001 \leq w \leq 0.10$, has been also proposed as a positive electrode active material which contributes to better cycle properties (Japanese Patent Unexamined Publication No. 63-121258).

The above oxide to be used as a positive electrode active material essentially includes at least one of Al, In, and Sn as the C component, thus improving the cycle properties of the lithium secondary battery. This improved lithium secondary battery, however, does not have sufficient energy density to meet the requirements in the market.

SUMMARY OF THE INVENTION

One object of the invention is to provide an improved lithium secondary battery comprising a positive electrode active material of high energy density, which can solve the above-mentioned problems.

Another object of the invention is to provide a lithium secondary battery comprising a positive electrode active material of high energy density, which has high energy density leading to high discharge capacity, high electromotive force, and high discharge voltage, and excellent cycle properties.

A lithium negative electrode has lowest potential, small atomic weight, and high capacity. It is thus important for a lithium secondary battery with high energy density to make a positive electrode have high potential and high capacity. Since the capacity of a positive electrode of a lithium battery is naturally determined by the formula weight of a compound reactive with 1 molar lithium, it is important to make the positive electrode have high potential. The potential of an electrode is theoretically determined by free energy, and the energy difference between a negative electrode and a positive electrode represents the electromotive force of a battery.

Thermodynamic data in a simpler system like lithium or zinc has been obtained, whereas sufficient thermodynamic data on oxides or chalcogenides to be used as a positive electrode of lithium secondary battery has not been collected.

When searching a high potential positive electrode, the inventors studied the relationship between cationic radius and potential in oxides to be used as a positive electrode active material of lithium secondary battery, and found a tendency of higher potential with smaller cationic radius. In particular, the inventors have found that, of the materials having smaller ionic radius, phosphorus has properties essentially suitable for a positive electrode active material, and that a phosphorous-containing positive electrode active material gives lithium secondary battery high potential and high energy density.

The present invention is based on the above findings, and the lithium secondary battery of the invention comprises a positive electrode, a negative electrode, and an electrolyte, wherein the positive electrode is composed of a positive electrode active material which comprises at least one compound selected from the group consisting of lithium phosphate, lithium-cobalt phosphate, cobalt oxide, and lithium-cobalt oxide so as to contain cobalt at a concentration of more than 0.1 mole with respect to 1 mole of lithium, and phosphorus at a concentration of more than 0.2 mole with respect to 1 mole of lithium. Preferably, the positive electrode active material includes a mixture of the above four compounds, that is, lithium phosphate, lithium-cobalt phosphate, cobalt oxide, and lithium-cobalt oxide so as to contain phosphorus at a concentration of 0.25 through 1.8 moles and cobalt at a concentration of 0.2 through 1.75 moles both with respect to 1 molar lithium.

The positive electrode active material in the context of the invention is preferably amorphous, and has an average particle size of 0.01 through 20 μm and a BET specific surface area of 1 through 1,000 m²/g.

The positive electrode further comprises a binder and an electrical conducting agent having particle sizes of 0.02 through 20 times that of the positive electrode active material. The preferable porosity of the positive electrode is 25 through 60%.

DETAILED DESCRIPTION OF THE INVENTION

The present invention provides a positive electrode active material to be used for a lithium secondary battery, which comprises at least one compound selected from the group consisting of lithium phosphate, lithium-cobalt phosphate, cobalt oxide, and lithium-cobalt oxide so as to contain cobalt at a concentration of more than 0.1 mole, and phosphorus at a concentration of more than 0.2 mole both with respect to 1 mole of lithium.

The positive electrode active material can be suitably prepared by mixing single bodies of lithium (Li), cobalt (Co), and phosphorus (P) or their oxides, hydroxides, salts such as carbonates, nitrates, and organic acid salts, or their organic compounds at a predetermined molar or atomic ratio, and treating the mixture by a known method for producing ceramics, such as solid phase sintering, standard sintering, sol-gel processing, CVD (chemical vapor deposition), PVD (physical vapor deposition), thermal spraying or pyrolysis.

The positive electrode active material is, for example, manufactured by weighing predetermined amounts of $Li_2CO_3$ (lithium carbonate), $2CoCO_3 \cdot 3Co(OH)_2$ (basic cobalt carbonate), and $H_3PO_4$ (85% phosphoric acid aqueous solution), sufficiently mixing them in a crucible, and heating the mixture at a temperature of 600° through 1,200° C. for 3–24 hours. The heated product may be pulverized into particles having desirable sizes as necessary.

The structure of the above product may be confirmed by X-ray diffraction analysis, electron-rays diffraction analysis, or electron microscope analysis.

Specifically, an X-ray powder diffraction analysis of the product obtained as above can identify that the product is a mixture containing lithium phosphate, lithium-cobalt phosphate, cobalt oxide, and lithium-cobalt oxide.

Figure 1:
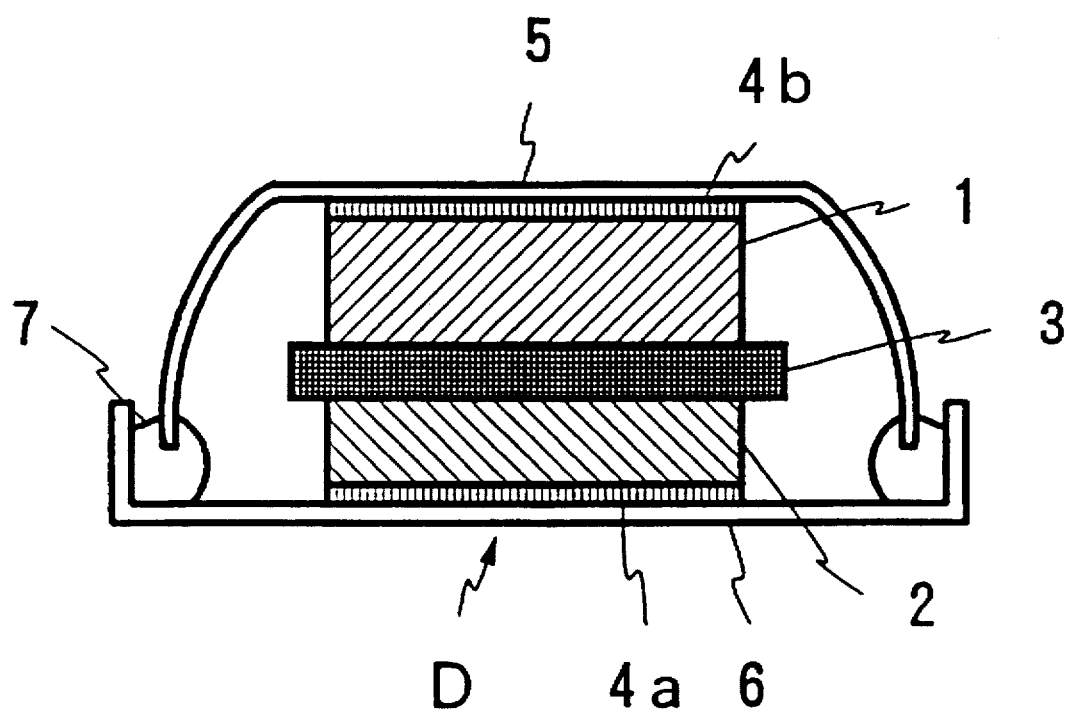
FIG. 1 is a schematic view showing a lithium secondary battery of one embodiment of the invention.

Using the each component of the mixture as a positive electrode active material, a lithium battery in a coin form as shown in FIG. 1 was fabricated, charged with 0.5 mA constant current for 6 hours, and then 1 hour later, open circuit voltage (OCV) was determined, the results of which are shown in Table 1.

TABLE 1

| Component | OCV (V) | Component | OCV (V) |
| --- | --- | --- | --- |
| Li phosphate | 4.2 | Li.Co oxide | 3.9 |
| Li.Co phosphate | 4.8 | Co oxide | 4.1 |

As shown in Table 1, lithium-cobalt phosphate in particular showed high open circuit voltage.

The lithium phosphate includes, for example, salts of lithium and metaphosphoric acid, pyrophosphoric acid, orthophosphoric acid, triphosphoric acid, or tetraphosphoric acid, with preference given to lithium orthophosphate.

The lithium-cobalt phosphate includes, for example, $Li_2CoPO_5$, $LiCoPO_4$, $LiCo_{0.5}P_{0.1}O_2$, and $LiCo_{0.5}P_{0.5}O_2$, with preference given to $LiCoPO_4$.

The cobalt oxide is exemplified by $CoO$, $Co_2O_3$, $CoO_2$, or $Co_3O_4$, with preference given to $Co_3O_4$.

Examples of the lithium-cobalt oxide include $LiCoO_2$, $Li_6CoO_4$, $Li_{0.73}CoO_2$, and $Li_{0.62}CoO_2$, with preference given to $LiCoO_2$.

The positive electrode active material to be used for the lithium secondary battery of the present invention has a molar ratio of cobalt:phosphorus:lithium=more than 0.1:more than 0.2:1, and comprises at least one member selected from the group of lithium phosphate, lithium-cobalt phosphate, cobalt oxide, and lithium-cobalt oxide so as to fulfill the above molar ratio. Insofar as the above-mentioned molar ratio is satisfied, the active material may comprise only one member from the aforementioned group. Alternatively, the active material may comprise two, three, or four members of the group, which may be exemplified by a combination of two members from cobalt oxide, lithium phosphate, and lithium-cobalt phosphate, a comb/nation of cobalt oxide and other two members, or a combination of all four members. Of these, a combination of three or more members of the group is preferable in that it affords lithium secondary battery a high electromotive force, with particular preference given to a combination of at least lithium phosphate, lithium-cobalt phosphate, and cobalt oxide.

In addition, transition metals besides cobalt, such as Ni, Fe, Mn, Cr, and V, their oxides, hydroxides, salts such as carbonates, nitrates, and organic acid salts, or their organic compounds may be added during the production of a positive electrode active material, with the result that a compound with part of the cobalt of the above-mentioned cobalt-containing compounds substituted by the aforementioned transition metal is produced.

Furthermore, it is essential in the invention that a predetermined amount of each component is used such that the aforementioned positive electrode active material has a molar ratio of cobalt:phosphorus:lithium=more than 0.1:more than 0.2:1, preferably 0.2–1.75:0.25–1.8:1, by which lithium phosphate, lithium-cobalt phosphate, cobalt oxide and/or lithium-cobalt oxide may be produced.

The molar ratio of phosphorus of not greater than 0.2 results in insufficient production of the phosphate, whereas that exceeding 1.8 has the same effect from a relatively decreased amount of lithium, thus undesirably lowering the discharge voltage.

The molar ratio of cobalt of not greater than 0.1 results in failure to discharge, whereas that exceeding 0.75 results in lower capacity.

The lithium secondary battery of the invention has a positive electrode composed of a mixture for positive electrode comprising at least the positive electrode active material described above, an electrical conducting agent, and a binder.

The electrical conducting agent is, for example, acetylene black or Ketzen black, and the binder may be any known material such as polytetrafluoroethylene, poly(vinylidene fluoride), hexafluoropropylene, polyethylene, or ethylene-propylene-diene terpolymer.

The mixture includes 5 through 15, preferably 7 through 12 parts by weight of the electrical conducting agent and 0.5 through 15, preferably 2 through 10 parts by weight of the binder. The amount of the positive electrode active material is such that makes the total amount 100 parts by weight. The mixture is sufficiently blended in a ball mill or a mortar. When the content of the electrical conducting agent or binder is below the range above, the positive electrode has insufficient electric conductivity or intensity. On the other hand, when the content of the electrical conducting agent or binder is above said range, the positive electrode contains a relatively smaller amount of oxide, which lowers the capacity of the positive electrode and undesirably decreases the energy density of the lithium secondary battery.

The uniformly blended mixture is then formed into a positive electrode having desirable shape and size, for example, a sheet, a film, or a disk, by a known method such as compression molding or roll forming.

The oxide mentioned above is pulverized to particles having an, average size of 0.01 through 20 μm, preferably 0.1 through 5 μm and a BET specific surface area of 1,000 through 1 $m^2/g$, preferably 500 through 5 $m^2/g$. The oxide thus pulverized is sufficiently dispersed and mixed with the electrical conducting agent and the binder, thus favorably increasing the capacity of the positive electrode.

The particle size of the electrical conducting agent and the binder shows the secondary particle size or an aggregate diameter.

Undesirably large, irregular pores formed in the positive electrode often cause cracks and defects during manufacture of the positive electrode, as well as decrease the capacity of the positive electrode.

In the present invention, the electrical conducting agent and the binder respectively have a particle size of 0.02 through 20 times, more preferably 0.1 through 5 times that of the oxide, which effectively prevents large, irregular pores from being formed in the positive electrode and allows pores of appropriate dimensions to be formed in the positive electrode. Formation of the appropriate pores increases the capacity of the positive electrode, prevents cracks and defects, and improves the formability into a positive electrode.

The porosity of the positive electrode may be changed as desired by controlling the heating temperature and time for manufacture thereof.

Pores uniformly formed in the positive electrode at the porosity of 25 through 60%, preferably 40 through 55% increase the amount of Li ion intercalated in a unit volume of the positive electrode, thus making the lithium secondary battery highly capacitive and compact.

As described above, the appropriate pores formed in the positive electrode increase the surface area of and thereby the capacity of the positive electrode, thus allowing the lithium secondary battery to have high energy density without a bulky positive electrode.

The positive electrode of the invention may include an amorphous (non-crystalline) oxide as a positive electrode active material. The amorphous structure allows a larger number of lithium ion to be intercalated at irregular intervals.

When a thermodynamically stable crystal is used as the positive electrode active material, lithium ion is intercalated at regular intervals in the crystalline structure. On the other hand, when an amorphous oxide is used as the positive electrode active material, a greater amount of lithium ion is intercalated at irregular intervals in the amorphous structure. The greater number of sites intercalating lithium ion makes the positive electrode highly capacitive, thus allowing a lithium secondary battery to have high energy density.

The oxide may be made amorphous by sputtering, abrupt cooling of a liquefied oxide, or mechanical alloying; however, the sputtering method is preferable in the present invention since the oxide has a high melting point.

The amorphous state of the oxide is confirmed, for example, by X-ray diffraction analysis (no sharp peaks are observed in amorphous state).

The lithium secondary battery of the invention further comprises a negative electrode and an electrolyte besides the positive electrode. The negative electrode may be composed of a material selected from the group including lithium, lithium alloys such as Li-Al, Li-Al-Mg, and Li-C, lithium-containing organic compounds such as polyparaphenylene, polyacetylene, polythiophene or polyacene doped with lithium ion, and carbon materials doped with lithium ion.

With regard to a lithium secondary battery, an active lithium negative electrode often causes occurrence of dendrite through repetitive charge and discharge, thereby shortening its cycle life.

In the invention, the lithium negative electrode is thus processed or treated appropriately so as to prevent occurrence of dendrite.

For example, the lithium negative electrode is processed according to the following steps: sputtering the surface of the lithium negative electrode with argon to remove the surface coating and make the surface smooth; and forming a lithium ion-conductive polymer film by plasma CVD to favorably prevent occurrence of dendrite.

The polymer film may be composed of any material which has sufficient lithium ion conductivity and is not reactive with lithium. The polymer is exemplified by, but not limited to, polysiloxane produced by polymerization of octamethylcyclotetrasiloxane, hexamethyldisiloxane, hexamethylcyclosiloxane, or ethyl silicate.

In an alternative method, the lithium negative electrode includes an electrodeposition layer formed on lithium for preventing dendrite. The electrodeposition layer consists of lithium ion and a metal alloyed with lithium. Such metal includes, for example, fine particles of boron, aluminum, silver, zinc, or tin. The size of the metal particles is not greater than 100 μm, preferably 0.01 through 10 μm.

The electrodeposition is implemented in the following manner; connecting a lithium negative electrode with an appropriate positive electrode in an electrolysis solution containing a predetermined amount of fine particles of the above metal, and applying a voltage between the negative and positive electrodes. The ratio of the metal fine particles to lithium ion is 5 through 500 atoms to 100 atoms, preferably about 50 through 300 atoms to 100 atoms.

An electrodeposition layer including lithium ion and metal fine particles is thus formed on lithium. The thickness of the electrodeposition layer may be varied by changing applied voltage and time period of electrolysis. In the present embodiment, the electrodeposition layer normally has the thickness of 0.1 through 300 μm, preferably about 5 through 50 μm.

A specific carbon electrode may be also used as a negative electrode. The carbon negative electrode effectively prevents dendrite without lowering energy density of the secondary battery.

The carbon negative electrode may be composed of a hollow carbon molecular structure expressed by the molecular formula Cn (n≧60), a carbonized organic member having 3.37 Å or greater $d_{002}$ in X-ray analysis, graphite, or composite thereof.

The hollow carbon molecular structure is generally called fullerene wherein carbon atoms are connected to one another to form a closed system as shown in FIG. 2.

Figure 2B:
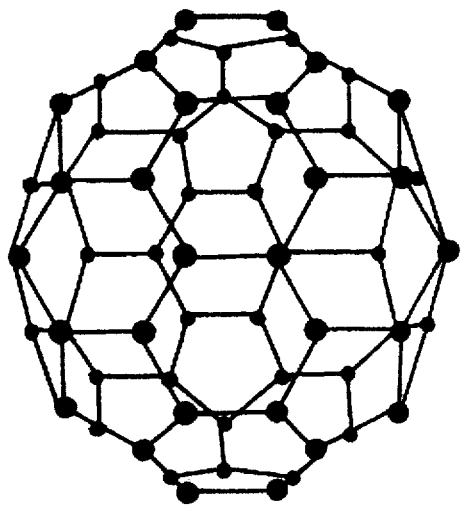
FIGS. 2(a) or 2(b) schematically illustrate structure of typical fullerenes.
Figure 2A:
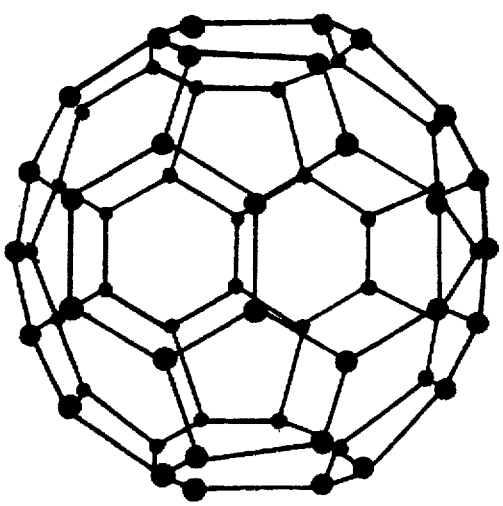

FIG. 2(a) and FIG. 2(b) respectively show $C_{60}$ fullerene and $C_{70}$ fullerene.

Although any hollow carbon molecular structure represented by the molecular formula Cn (n≧60) and consisting of a closed system of connected carbon atoms may be used as the negative electrode of the invention, $C_{60}$ or $C_{70}$ fullerene shown in FIG. 2(a) or 2(b) is especially preferable.

The hollow carbon molecular structure may include two or more carbon molecules consisting of different numbers of carbon atoms.

The carbonized organic member is obtained by pyrolysis or firing and carbonization of various organic compounds; for example, vapor growth carbon fibers or pitch carbonaceous material.

The vapor growth carbon fibers are obtained by vapor phase pyrolysis of carbon compounds such as benzene, methane, and carbon oxides in the presence of transition metal catalyst. The vapor growth carbon fibers may be used in the original fiber state or pulverized into particles before use.

The pitch carbonaceous material includes pitches obtained by pyrolysis of oil or carbon such as coal pitch, oil pitch, asphalt pitch, coal tar pitch, crude oil decompositive pitch, and oil sludge pitch, those obtained by pyrolysis of high molecule polymers, and those obtained by pyrolysis of low molecular organic compounds such as tetrabenzophenazine.

The graphite may be any known natural or synthetic graphite.

The above carbon material is pulverized or processed into particles of appropriate size, mixed with a binder, and formed into a carbon negative electrode of a desirable shape and size by compression molding, roll forming, or another appropriate method.

The electrolyte is required to show sufficient ionic conductivity when dissolved in an organic nonaqueous solvent. The electrolyte is composed of an electrolytic salt at least containing Li ion and anion which do not cause electrode reaction on charge or discharge. Such anion includes anions of Bronsted acids such as $ClO_4^-$, anions of Lewis acids such as $BF_4^-$ and $PF_6^-$, and anions of organic acids such as $CF_3SO_3^-$.

The electrolysis solution is prepared by dissolving one or a plurality of the above electrolytes in an organic solvent such as ethylene carbonate, propylene carbonate, dimethylsulfoxide, sulfolane, δ-butyrolactone, 1,2-dimethoxyethane, N,N-dimethylformamide, tetrahydrofuran, 1,3-dioxolane, 2-methyltetrahydrofuran, diethyl ether, or mixture thereof.

The concentration of the electrolysis solution is typically 0.1 through 3 mole/l.

When lithium or lithium alloy is used as a negative electrode of the secondary lithium battery of the invention, it is preferable that the electrolysis solution further include an unsaturated heterocyclic compound, an aromatic hydrocarbon, or a saturated ring hydrocarbon as an additive to prevent occurrence of dendrite on the lithium negative electrode.

The unsaturated heterocyclic compound includes, for example, thiophone, pyrrole and furan. The aromatic hydrocarbon may be benzene or naphthalene. The saturated ring hydrocarbon is, for example, cyclohexane or decalin. One or a plurality of such materials are added to the electrolysis solution at a concentration of 0.1 through 10 ml/l according to the concentration of the electrolysis solution.

When the concentration of the additive is less than 0.1 ml/l, occurrence of dendrite is not effectively prevented. When the concentration exceeds 10 ml/l, on the other hand, the coulombic efficiency in charge and discharge cycling undesirably drop. The lithium secondary battery of the invention has high electromotive force and is thereby charged at high voltage. It is thus preferable that the electrolysis solution be not easily decomposed by such high voltage charge. A preferable combination of the electrolysis solution is sulfolane and/or ethylene carbonate and a low-viscous organic solvent.

Sulfolane has high permittivity (approximately 44), high decomposition voltage (6 V), and viscosity of approximately 10 cps. Ethylene carbonate is solid at ordinary temperature and has high permittivity (approximately 90) and high decomposition voltage (not less than 6 V). Both sulfolane and ethylene carbonate extend the potential in the positive direction. The low-viscous organic solvent preferably has a viscosity not greater than 1 cps, and is mixed with sulfolane or ethylene carbonate to lower the viscosity of the electrolysis solution and improve the electric conductivity. The low-viscous organic solvent is, for example, methyl formate, methyl acetate, dimethyl carbonate, diethyl carbonate, 1,2-dimethoxyethane, N,N-dimethylformamide, tetrahydrofuran, 1,3-dioxolane, 2-methyltetrahydrofuran, or diethyl ether. Especially, dimethyl carbonate or diethyl carbonate having excellent ionic conductivity is preferable.

The mixing ratio of sulfolane and/or ethylene carbonate to the low-viscous organic solvent is 20 through 80% by volume to 80 through 20% by volume, preferably 40 through 70% by volume to 60 through 30% by volume.

When the fraction of sulfolane and/or ethylene carbonate is less than 20% by volume, neither the decomposition voltage of the electrolyte nor the permittivity is sufficiently high. On the other hand, when the fraction of sulfolane and/or ethylene carbonate exceeds 80% by volume, undesirably high viscosity of the electrolyte lowers the ionic conductivity.

Such mixed organic solvent effectively prevents decomposition of the electrolyte at high voltages, thus allowing the lithium secondary battery to be charged at high voltage and repeatedly charged and discharged in stable conditions.

The concentration of the lithium salt in the electrolysis solution is appropriately determined according to the type and performance of the battery, which is 0.1 through 3 mole/l in general.

The electrolysis solution may be used in any form, that is, the original liquid state, a solid electrolyte prepared by impregnating an appropriate polymer or porous member with the electrolysis solution, or a gel electrolyte prepared by impregnating a gel substance with the electrolysis solution or gelling the electrolysis solution as a reactive solvent.

When a solid electrolyte is composed of a polymer film containing the electrolyte, the polymer used may be selected from the group including poly(ethylene oxide), poly(propylene oxide), polyphosphazene, polyaziridine, poly(ethylene sulfide), and derivatives, mixture, and composite thereof. The solid electrolyte is prepared by mixing the polymer with the electrolyte and forming a polymer film by a known method.

Alternatively, the above-mentioned polymer film is prepared into a porous polymer film, and the porous film is impregnated with an electrolysis solution, thereby to give a solid electrolyte.

The porous member is composed of crosslinked polymer containing polar units and having the average pore diameter of not greater than 50 μm, preferably 10 through 0.01 μm. The porous member is prepared by crosslinking a composite polymer including polar unit-containing polymer and non-polar polymer in the presence of a crosslinking agent and then removing the non-polar polymer. The solid electrolyte is then prepared by impregnating the porous member with the electrolysis solution. The polar unit-containing polymer is that containing a polar unit such as ether or hydroxyl group, for example, poly(ethylene oxide), poly(propylene oxide), ethylene oxidepropylene oxide copolymer, polyvinyl alcohol, or vinyl alcohol-alkylene oxide copolymer. The saponification ratio of polyvinyl alcohol or vinyl alcohol-alkylene oxide copolymer is not less than 70%, preferably not less than 85%.

The molecular weight of the crosslinked, polar unit-containing polymer is not limited, but is generally not greater than five million, more preferably between one thousand to one million for improved preparation efficiency.

The non-polar polymer is insoluble or only slightly soluble in the polar unit-containing polymer, and may be aromatic or hydrocarbon polymers such as polyisoprene rubber, polybutadiene, and polystyrene having no polar units. The molecular weight of the non-polar polymer is not limited, but is generally not greater than five million, preferably between about one thousand and one million for improved preparation efficiency and easy removal.

The composite polymer is prepared by any desirable method which allows formation of a porous member by selective removal of the non-polar polymer; for example, by kneading the polar unit-containing polymer and the non-polar polymer via a roll, by stirring the polar unit-containing polymer and the non-polar polymer via a solvent, or by introducing a functional group such as carboxyl or amino group on the polymer terminal and using a metal chelating agent such as copper chloride to associate the polar unit-containing polymer with the non-polar polymer via the functional group on the molecular terminal. A typical process of the last method is block copolymerization by association of macromonomers, which is especially preferable for formation of a densely packed porous member.

The mixing ratio of the non-polar polymer to the polar unit-containing polymer in the composite polymer is appropriately determined according to the desirable porosity of the resulting porous electrolyte base, but is generally 10 through 1000 parts by weight, preferably 20 through 500 parts by weight, most preferably 30 through 200 parts by weight to 100 parts by weight.

A porous electrolyte base is then prepared by crosslinking the polar unit-containing polymer in the prepared composite polymer in the presence of a crosslinking agent and removing the non-polar polymer. The composite polymer is formed in any desirable shape corresponding to the shape of the resulting porous electrolyte base; for example, film, sheet, or fibers for a nonwoven fabric. In the film or sheet form, the thickness of the composite polymer is determined appropriately, but not greater than 1 mm in general, preferably 0.1 through 0.01 mm.

The crosslinking agent to be used for crosslinking the polar unit-containing polymer is added to the composite polymer at any desirable time during or after preparation of the composite polymer. It is preferable that the crosslinking agent does not affect or crosslink the non-polar polymer which is eventually removed at a later stage. Preferred examples of the crosslinking agent include organic peroxides such as dicumyl peroxide. The ratio of the crosslinking agent to the polar unit-containing polymer is, but not limited to, generally 0.1 through 20 parts by weight to 100 parts by weight.

The non-polar polymer is removed from the composite polymer after crosslinking process by appropriate method, for example, solvent extraction, ozone decomposition of double bond, or extraction with solvent which releases the association via the functional group on the molecular terminal.

The solid electrolyte is prepared, for example, by impregnating a porous electrolyte base consisting of the crosslinked, polar unit-containing polymer with an electrolytic solution, especially an electrolyte dissolved in an organic solvent, and then drying the impregnated porous electrolyte base.

The porous member is, for example, a glass filter used also as a separator. In this case, the solid electrolyte is prepared by impregnating or filling the pores of the porous member with the electrolysis solution.

The electrolyte used in the invention may be a gel electrolyte prepared by impregnating a gel substance with the electrolysis solution. The gel substance used here may be organogels of polyvinyl alcohol or of composition of polyvinyl alcohol and poly(ethylene oxide) and/or vinyl alcohol-ethylene oxide copolymer.

Polyvinyl alcohol used for formation of organogel has the degree of polymerization of 500 through 5000 (weight-average molecular weight 22 through 220 thousand), more preferably 1000 through 3000, and degree of saponification of not less than 80%, more preferably 85 through 99%. When the degree of polymerization is too low, the high crystalline properties prevent efficient gelation. On the other hand, when the degree of polymerization is too high, the high viscosity of the solution prevents formation of uniform organogel. When the degree of saponification is less than 80%, steric hindrance due to the acetic acid residue prevents sufficient coagulation or gelation. The concentration of polyvinyl alcohol in the gelling solution is not greater than 30% by weight, more preferably 10 through 20% by weight.

The weight-average molecular weight of poly(ethylene oxide) is not greater than two million, preferably between ten thousand and one million. The ratio of poly(ethylene oxide) to polyvinyl alcohol is generally 1 through 3000 parts by weight, preferably 10 through 1000 parts by weight, most preferably 30 through 300 parts by weight to 100 parts by weight. The mixed polymer having the general weight-average molecular weight of approximately 500 thousand may be used as a practically sufficient organogel.

The vinyl alcohol-ethylene oxide copolymer preferably has the weight-average molecular weight of 20 through 500 thousand, the vinyl acetate content of not greater than 20%, more preferably 15% for sufficient gelation. The ratio of the vinyl alcohol units (including vinyl acetate units) to ethylene oxide units is 1 through 3000, preferably 10 through 1000, most preferably 30 through 300 to 100. The copolymer having the weight-average molecular weight of approximately 500 thousand may be used as a practically sufficient organogel. The vinyl alcohol-ethylene oxide copolymer may have any desirable form as random copolymer or block copolymer.

Polyvinyl alcohol, polyethylene oxide and vinyl alcohol-ethylene oxide copolymer are concurrently used at a ratio similar to that of the above-mentioned composite polymer, based on the vinyl alcohol units (including vinyl acetate units) and ethylene oxide units. A vinyl alcohol-ethylene oxide copolymer is preferably used in that a uniform, tough organogel is obtainable, the toughness being attributable to entanglement of long molecular chains of the copolymer.

Organogel is prepared by, for example, freezing and thawing, freezing and drying, or rapidly cooling an aqueous solution of a polymer [polyvinyl alcohol solely, mixed polymer of polyvinyl alcohol and polyethylene oxide or/and vinyl alcohol-ethylene oxide copolymer (hereinafter the term polymer refers to these polymers)] to give water-containing gel, drying the gel, and immersing the gel in an organic solvent to impregnate the gel with the organic solvent. The water-containing gel is converted to an organogel, since water-containing gel having priority for electrolysis of water does not function as an electrolyte for an electric conductor including metal ion which is less reduced than is hydrogen ion.

An organogel is also prepared by dissolving the polymer in an organic solvent with strong polarity such as dimethylsulfoxide, dimethylformamide, dimethylacetamide, or N-methylpyrrolidone, and allowing the solution to stand, in which case an organogel can be formed directly. When an improvement in ionic conductivity is desired, other organic solvent such as propylenecarbonate may be used. The organogel obtained as above containing no unreacted crosslinking agent is advantageous in that it is superior in durability or resistance to electrical degradation to that obtained with the use of crosslinking agent and by irradiation of light and/or heating.

The polymer concentration of the solution as mentioned above is preferably not more than 30% by weight, more preferably 10–20% by weight. Water-containing gel and organogel are efficiently obtained by adding an alkali metal salt, a transition metal salt or/and a metal hydroxide slightly soluble in the organic solvent, to an aqueous solution of polymer or a solution of polymer in organic solvent, for better gelation. The gelation can be also enhanced by adding other kinds of metal salt which produces slightly soluble metal hydroxide to said solutions, to immerse the gel in an alkaline solution such as sodium hydroxide solution or potassium hydroxide solution. In the latter case, the desired gel can be formed by immersing an open container containing gel, in an alkaline solution.

A promoter for the aforementioned gelation includes, for example, halides and hydroxides of alkali metals such as sodium, potassium, and lithium; halides and hydroxides of transition metals such as iron, copper, nickel, chromium, titanium, molybdenum, and tungsten; metal hydroxides slightly soluble in organic solvent, such as iron hydroxide, copper hydroxide, chromium hydroxide, calcium hydroxide, and magnesium hydroxide; and metal halides such as chlorides of metals (e.g. iron, copper, chromium, calcium, magnesium) producing slightly-soluble metal hydroxides.

The ratio of the gelation promoter to the polymer is generally not more than 200, preferably 5–150, more preferably 20–100 parts by weight to 100 parts by weight. Salts of transition metals as a gelation promoter can improve toughness of organogel.

The electrolyte is used in an appropriate amount depending on the use or non-use of other gelation promoters. The amount is such as that necessary as a gelation promoter plus that remaining in polymer gel as electrolyte and contributing to ionic conductivity. The lithium salt used as a gelation promoter and electrolyte functions as an ionic conductor with only an amount not more than 1-twentieth (atomic ratio) based on the hydroxyl group in the polymer.

The ratio of the electrolyte which contributes to the ionic conductivity, to the polymer is appropriately determined depending on the desired ionic conductivity, which is generally not more than 100, preferably 5–50 parts by weight to 100 parts by weight.

The gel electrolyte is prepared by, for example, allowing the organic solvent used for producing organogel from water-containing gel of polyvinyl alcohol to contain electrolyte, or replacing the organic solvent in organogel with organic solvent containing electrolyte, or adding electrolyte to polyvinyl alcohol solution when preparing water-containing gel or organogel of polyvinyl alcohol.

As a result, gel electrolyte is obtained together with the water-containing gel or organogel of polyvinyl alcohol. The water-containing gel is processed into organogel with the use of an organic solvent containing electrolyte.

When electrolyte such as lithium salt which functions as gelation promoter is used, it does not contribute to ionic conductivity. It is preferable to adequately adjust the amount of the electrolyte such that lithium ion in the electrolyte is present in the water-containing gel or organogel of polyvinyl alcohol in an amount sufficient for the desired ionic conductivity.

In the present invention, the above-mentioned solid electrolyte or gel electrolyte is optionally, but generally formed into a film or a sheet with a thickness of not more than 500 µm, preferably 1–100 µm.

In practical use, the gel electrolyte is preferably processed appropriately by several hours of drying under reduced pressure on demand to prevent bleeding by removing organic solvent in excess.

With the gel electrolyte, an organogel made from polyvinyl alcohol or vinyl alcohol-ethylene oxide copolymer has elastic properties with practically sufficient mechanical strength enduring tension, bending, and twisting, and permits easy formation into thin film and easy formation into film or sheet superior in flexibility and deformability. The gel electrolyte shows good adhesion with electrodes, which leads to an improved ionic conductivity, as a result of the crystalline properties of polyvinyl alcohol which are lower than those when in solid, superior dissolution of lithium ion by vinyl alcohol component, superior conductivity of lithium ion through active segment movements by ethylene oxide component, and improved amorphous property caused by the crystalline properties lowered by the concomitant use of the both components.

In the present invention, a lithium secondary battery is fabricated by assembling a positive electrode, a negative electrode, and an electrolyte in, for example, the structure shown in FIG. 1. In the Figure, D is a lithium secondary battery composed of a positive electrode 2, a negative electrode 1 and a separator 3 located in between them, wherein a positive electrode can 6 press-abutted against a collecting electrode 4a press-attached on the outer surface of the positive electrode 2, and a negative cap 5 press-abutted against a collecting electrode 4b press-attached on the outer surface of the negative electrode 1 are sealed with an insulator 7.

The lithium secondary battery with the structure wherein a positive electrode, a separator (or solid electrolyte), and a negative electrode are wound in a roll has favorably high capacity.

In the present invention, a positive electrode active material including a compound containing phosphorous with small ionic radius and smaller formula amount than that of transition mental is used. The positive electrode composed of the same has high electromotive force and less weight, and greater Li ion intercalation per unit weight.

The positive electrode active material made amorphous increases the number of sites to intercalate Li ion.

The positive electrode with a porosity of 25–60% affords greater intercalation of Li ion per unit volume.

A lithium battery composed of a positive electrode with high electromotive force and high capacity has high energy density with a greater amount of Li ion intercalated per unit volume and weight of the positive electrode.

In addition, formation into a positive electrode can be improved by specifically adjusting the particle size and BET specific surface area of the positive electrode active material as described, and preparing a positive electrode with uniform pores using an electrical conducting agent and a binder adjusted to have specific particle size depending on that of the aforesaid active material, thus preventing cracks and defects. Also, the uniform pores formed can prevent irregular discharge voltage of the lithium battery.

As the negative electrode, a carbon negative electrode is preferable in that degradation of negative electrode and internal short-circuit due to dendrite can be prevented.

The electrolyte prepared by dissolving lithium salt in a mixed solvent containing at least sulfolane and/or ethylenecarbonate, and a low-viscosity organic solvent prevents decomposition of the electrolyte by high voltage during charge.

The electrolyte prepared by adding an unsaturated heterocyclic compound, an aromatic hydrocarbon, or a saturated cyclic hydrocarbon to an organic solvent containing a metal salt, prevents occurrence of dendrite in a lithium negative electrode, thus prohibiting degradation of negative electrode and internal short-circuit.

The present invention is further described in detail according to some embodiments, which are only illustrative and not restrictive in any sense.

EXAMPLE 1

Predetermined amounts of lithium carbonate, basic cobalt carbonate, and 85% phosphoric acid aqueous solution were weighed to fulfill an atomic ratio of Li:Co:P=2:1:1, sufficiently mixed in an alumina crucible, and heated at 900° C. in an electric oven for twenty-four hours.

The heated product was identified by X-ray powder diffraction analysis with the use of JCPDS cards. The results of the X-ray analysis showed that the product contained lithium phosphate, lithium-cobalt phosphate, and cobalt oxide at a molar ratio of Li:Co:P=1:0.5:0.5.

Manufacture of Positive Electrode

The heated product was pulverized into a positive electrode active material having a particle size of not greater than 20 μm. The obtained positive electrode active material (8 parts by weight), acetylene black (1 part by weight), and Teflon powder (1 part by weight) were sufficiently mixed to give a positive electrode product.

The obtained positive electrode product (100 mg) was press-molded on a nickel mesh to give a positive electrode disk having a diameter of 20 mm and a thickness of 0.5 mm.

Manufacture of Negative Electrode

A 20.0 mm-diameter disk was punched out from a 1.0 mm-thick lithium sheet, and on one side thereof was press-adhered a nickel mesh to give a negative electrode disk.

Manufacture of Separator

A 25.0 mm-diameter disk was punched out from a 0.05 mm-thick porous polypropylene film to give a separator disk.

Preparation of Electrolysis Solution

Lithium perchlorate was dissolved in a proportion of one mole/l in a mixture of propylene carbonate and 1,2-dimethoxyethane at a volume ratio of 1:1 which had been adjusted to contain water at 50 ppm or less, thereby to prepare an electrolysis solution.

Fabrication of Lithium Battery

A positive electrode 2, a negative electrode 1, and a separator 3 manufactured as above were assembled as shown in FIG. 1 to give a lithium battery D wherein a stainless can 6 was press-abutted against a collecting electrode 4a formed on the outer surface of the positive electrode 2, and a stainless cap 5 was press-abutted against a collecting electrode 4b formed on the outer surface of the negative electrode 1, and the aforementioned electrolysis solution was contained in a room formed by the positive electrode can 6 and the negative electrode cap 5, which was sealed with a gasket 7.

EXAMPLE 2, 3

In the same manner as in Example 1 except that the atomic ratio of lithium carbonate, basic cobalt carbonate, and 85% phosphoric acid aqueous solution was changed as shown in Table 2, a heated product was prepared. The results of X-ray powder analysis and following identification showed that the product contained lithium phosphate, lithium-cobalt phosphate, and cobalt oxide at a molar ratio of Co:P:Li=0.4:1.6:1 for Example 2, and 1.6:0.4:1 for Example 3. Each product was pulverized into a positive electrode active material having a particle size of not greater than 20 μm, using which a positive electrode was manufactured in the same manner as in Example 1. A lithium battery was fabricated using the positive electrode, and a negative electrode, a separator, and an electrolysis solution prepared in the same manner as in Example 1.

COMPARATIVE EXAMPLE 1

Predetermined amounts of lithium carbonate and basic cobalt carbonate were weighed to fulfill an atomic ratio of Li:Co=1:1, sufficiently mixed in an alumina crucible, and heated at 900° C. in an electric oven for 24 hours.

The heated product was identified by X-ray powder diffraction analysis with the JCPDS card No. 16-427 indicating $LiCoO_2$. The result of the X-ray analysis showed that the product had an $LiCoO_2$ phase.

Using the product as a positive electrode active material, a lithium battery was fabricated in the same manner as in Example 1.

COMPARATIVE EXAMPLE 2

Predetermined amounts of lithium carbonate, basic cobalt carbonate, and basic nickel carbonate were weighed to fulfill an atomic ratio of Li:Co:Ni=1:0.5:0.5, sufficiently mixed in an alumina crucible, and heated at 900° C. in an electric oven for 24 hours as in Example 1.

The heated product was identified by X-ray powder diffraction analysis with the JCPDS card No. 16-427. The result of the X-ray analysis showed that the product had the same crystalline structure as that of $LiCoO_2$.

Using the product as a positive electrode active material, a lithium battery was fabricated in the same manner as in Example 1.

COMPARATIVE EXAMPLE 3

In the same manner as in Example 1 except that the predetermined amounts of lithium carbonate, basic cobalt carbonate, and lithium phosphate were weighed to fulfill a molar ratio of Li:Co:P=1.15:1:0.05, an oxide was prepared. The product was identified by X-ray powder diffraction analysis with the JCPDS card No. 16-427. The result of the X-ray analysis showed that the product had an $LiCoO_2$ phase.

Using the product as a positive electrode active material, a lithium battery was fabricated in the same manner as in Example 1.

COMPARATIVE EXAMPLE 4

In the same manner as in Example 1 except that the predetermined amounts of lithium oxide, basic cobalt carbonate, and phosphorus pentaoxide were weighed to fulfill a molar ratio of Li:Co:P=1:0.8:0.2, an oxide was prepared.

The oxide was identified by X-ray powder diffraction analysis with the JCPDS card No. 16-427. The result of the X-ray analysis showed that the oxide had an $LiCoO_2$ phase.

Using the product as a positive electrode active material, a lithium battery was fabricated in the same manner as in Example 1.

TABLE 2

| | Mixture for positive electrode | | | | | | |
|---|---|---|---|---|---|---|---|
| | Positive electrode active material | | | | | Electrical conducting agent acetylene black | Binder PTFE |
| | Atomic ratio | | | | Amount | | |
| | Li | Co | Ni | P | (mg) | (mg) | (mg) |
| Ex. 1 | 1 | 0.5 | — | 0.5 | 80 | 10 | 10 |
| Ex. 2 | 1 | 0.4 | — | 1.6 | 80 | 10 | 10 |
| Ex. 3 | 1 | 1.6 | — | 0.4 | 80 | 10 | 10 |
| Com. Ex. 1 | 1 | 1 | — | — | 80 | 10 | 10 |
| Com. Ex. 2 | 1 | 0.5 | 0.5 | — | 80 | 10 | 10 |
| Com. Ex. 3 | 1.15 | 1.0 | — | 0.05 | 80 | 10 | 10 |
| Com. Ex. 4 | 1 | 0.8 | — | 0.2 | 80 | 10 | 10 |

Note:
PTFE is polytetrafluoroethylene.

Each of the lithium batteries fabricated in Examples 1–3 and Comparative Examples 1–4 was charged with 0.5 mA constant current. Discharge and charge were repeated to examine discharge capacity at various cycles, the results of which are shown in Table 3.

TABLE 3

| | Discharge property Discharge voltage (V) Time | | | | Cycle property Discharge capacity (mAh) Number of cycles | | | | | |
|---|---|---|---|---|---|---|---|---|---|---|
| | initial value | 10 hr | 20 hr | 30 hr | initial value | 20 | 40 | 60 | 80 | 100 |
| Ex. 1 | 4.7 | 4.4 | 4.4 | 4.0 | 16.5 | 14.8 | 14.2 | 13.3 | 12.4 | 12.0 |
| Ex. 2 | 4.9 | 4.5 | 4.4 | 4.0 | 17.0 | 16.0 | 15.3 | 14.1 | 13.3 | 12.8 |
| Ex. 3 | 4.6 | 4.3 | 4.3 | 3.9 | 15.5 | 14.4 | 13.5 | 12.3 | 11.2 | 10.1 |
| Com. Ex. 1 | 4.4 | 4.0 | 3.9 | — | 12.0 | 6.4 | 5.7 | 5.0 | 4.5 | 4.0 |
| Com. Ex. 2 | 4.5 | 3.6 | 3.6 | — | 13.5 | 7.1 | 6.5 | 6.4 | 5.8 | 5.2 |
| Com. Ex. 3 | 4.3 | 4.0 | 3.9 | — | 12.1 | 6.6 | 5.8 | 5.5 | 5.0 | 4.8 |
| Com. Ex. 4 | 4.5 | 4.1 | 3.8 | — | 12.3 | 9.0 | 8.5 | 8.4 | 8.1 | 7.2 |

As is evident from Table 3, the lithium batteries of Examples 1–3 showed higher discharge voltage than did those of Comparative Examples 1–4, indicating that they have high energy density with high initial discharge capacity, and are superior in cycle property.

EXAMPLE 4

Predetermined amounts of lithium carbonate, basic cobalt carbonate, basic nickel carbonate, and 85% phosphoric acid aqueous solution were weighed to fulfill an atomic ratio of Li:Co:Ni:P=1:0.3:0.3:0.4, sufficiently mixed in an alumina crucible, and heated at 900° C. in an electric oven for 24 hours.

The heated product was identified by X-ray powder diffraction analysis with JCPDS cards. The result of the X-ray analysis showed that the product contained lithium phosphate, lithium-cobalt-nickel phosphate, and cobalt-nickel oxide at a molar ratio as shown in Table 4.

The product was pulverized into a positive electrode active material having a particle size of not greater than 20 μm, using which a positive electrode was manufactured as in Example 1. A lithium battery was fabricated using the positive electrode, and a negative electrode, a separator, and an electrolysis solution prepared in the same manner as in Example 1.

COMPARATIVE EXAMPLE 5

Predetermined amounts of lithium oxide, cobalt oxide, Tin(IV) oxide, and phosphorus pentaoxide were weighed to fulfill an atomic ratio of Li:Co:Sn:P=1.01:0.95:0.04:0.002, and mixed. The mixture was calcined at 650° C. for 5 hours, followed by heating in air at 850° C. for 12 hours to give an oxide. The oxide was identified by X-ray powder diffraction analysis with the JCPDS card No. 16-427. The result of the X-ray analysis showed that the product had an $LiCoO_2$ phase.

Using the oxide as a positive electrode active material, a lithium battery was fabricated in the same manner as in Example 1.

EXAMPLES 5, 6

In the same manner as in Example 4 except that the atomic ratio of lithium carbonate, basic cobalt carbonate, basic nickel carbonate, and 85% phosphoric acid aqueous solution was changed as shown in Table 4, an oxide was prepared. The result of X-ray powder analysis and following identification showed that the oxide of Example 5 contained lithium phosphate, lithium-cobalt phosphate, and cobalt oxide, and the oxide of Example 6 additionally contained lithium-cobalt oxide, both at a molar ratio of cobalt, nickel, and phosphorus relative to 1 mole of lithium as shown in Table 4.

TABLE 4

| | Mixture for positive electrode | | | | | | |
|---|---|---|---|---|---|---|---|
| | Positive electrode active material | | | | | Electrical conducting agent acetylene black | Binder PTFE |
| | Atomic ratio | | | | Amount | | |
| | Li | Co | Ni | P | (mg) | (mg) | (mg) |
| Ex. 4 | 1 | 0.3 | 0.3 | 0.4 | 80 | 10 | 10 |
| Ex. 5 | 1 | 0.2 | 0.2 | 0.6 | 80 | 10 | 10 |
| Ex. 6 | 1 | 0.4 | 0.4 | 0.25 | 80 | 10 | 10 |
| Com. Ex. 5 | 1.01 | 0.95 | <u>0.04</u> | 0.002 | 80 | 10 | 10 |

Note:
The underlined figure shows the atomic ratio of Sn.
PTFE is polytetrafluoroethylene.

Each of the products was pulverized into a positive electrode active material having a particle size of not greater than 20 μm, using which a positive electrode was manufactured as in Example 1.

A lithium battery was fabricated using the positive electrode, and a negative electrode, a separator, and an electrolysis solution prepared in the same manner as in Example 1.

Each of the lithium batteries fabricated in Examples 4–6, and Comparative Example 5 was charged with 0.5 mA constant current. Discharge and charge were repeated to examine discharge capacity at various cycles, the results of which are shown in Table 5.

TABLE 5

| | Discharge property Discharge voltage (V) Time | | | | Cycle property Discharge capacity (mAh) Number of cycles | | | | | |
|---|---|---|---|---|---|---|---|---|---|---|
| | initial value | 10 hr | 20 hr | 30 hr | initial value | 20 | 40 | 60 | 80 | 100 |
| Ex. 4 | 4.5 | 4.3 | 4.3 | 3.9 | 17.0 | 16.0 | 14.8 | 14.7 | 13.9 | 13.1 |
| Ex. 5 | 4.6 | 4.4 | 4.4 | 4.0 | 18.2 | 17.3 | 15.1 | 14.2 | 14.0 | 13.5 |
| Ex. 6 | 4.5 | 4.2 | 4.2 | 3.8 | 16.2 | 15.9 | 14.5 | 14.0 | 13.5 | 12.7 |
| Com. Ex. 5 | 4.4 | 3.9 | 3.9 | — | 12.3 | 9.4 | 8.3 | 7.9 | 7.3 | 6.5 |

As is evident from Table 5, the lithium batteries of Examples 4–6 showed higher discharge voltage than did the battery of Comparative Example 5, indicating that they have high energy density with high initial discharge capacity, and are superior in cycle property.

EXAMPLE 7

Predetermined amounts of lithium oxide, cobalt oxide, and phosphorus pentaoxide powders were weighed to fulfill an atomic ratio of Li:Co:P=2:1:1, and sufficiently pulverized and kneaded in a mortar. The mixture as a powder target was subjected to sputtering using $Ar/O_2=\frac{1}{1}$ sputtering gas at rf power 50 W, and sputtering gas pressure $1\times10^{-2}$ Torr into deposition on a stainless substrate. The deposited product was collected, and pulverized in a ball mill to give a positive electrode active material having an average particle size of 5 μm.

The positive electrode active material was subjected to X-ray diffraction analysis. As a result, the deposition did not show sharp peaks, indicating that the deposition was amorphous.

A lithium battery was fabricated in the same manner as in Example 1 by using said amorphous positive electrode active material.

EXAMPLE 8

The pulverized mixture of lithium oxide, cobalt oxide, and phosphorus pentaoxide as prepared in Example 7 was heat-melted in an alumina crucible at 1500° C., and injected on a rotary roll. After rapid cooling, the product was pulverized in a ball mill to give a positive electrode active material having an average particle size of 5 μm.

The positive electrode active material was subjected to X-ray diffraction analysis. As a result, the product did not show sharp peaks, indicating that the product was amorphous.

A lithium battery was fabricated in the same manner as in Example 1 by using said amorphous positive electrode active material.

EXAMPLE 9

The pulverized mixture of lithium oxide, cobalt oxide, and phosphorus pentaoxide as prepared in Example 7 underwent mechanical alloying using a high speed vibrating mill to produce a positive electrode active material having an average particle size of 5 μm.

The positive electrode active material was subjected to X-ray diffraction analysis. As a result, the product did not show sharp peaks, indicating that the product was amorphous.

A lithium battery was fabricated in the same manner as in Example 1 by using said amorphous positive electrode active material.

Each of the lithium batteries fabricated in Examples 7–9 was charged with 0.5 mA constant current. Discharge and charge were repeated to examine discharge capacity, the results of which are shown in Table 6.

TABLE 6

|  | Ex. 7 | Ex. 8 | Ex. 9 |
| --- | --- | --- | --- |
| Discharge capacity (mAh) | 20.5 | 19.7 | 20.1 |

EXAMPLE 10

The positive electrode active material obtained in Example 1 was further pulverized in a ball mill for 24 hours to adjust the average particle size thereof to about 0.5 μm, and the BET specific surface area to 5 $m^2/g$.

Twenty lithium batteries were fabricated in the same manner as in Example 1 by using this positive electrode.

EXAMPLES 11, 12

In the same manner as in Example 10 except that the average particle size, and the BET specific surface area of the positive electrode active material were changed as shown in Table 3 by varying the pulverizing time in a ball mill, 20 lithium batteries were fabricated in each Example.

The lithium batteries of Examples 10–12 were charged in the same manner as above, and discharge capacity was determined, the results of which are shown in Table 7 wherein the figures are average values.

TABLE 7

| | Positive electrode active material Average particle size (μm) | BET specific surface area ($m^2/g$) | Discharge capacity (mAh) | | |
| --- | --- | --- | --- | --- | --- |
| | | | Max. | Min. | Average |
| Ex. 10 | 0.5 | 5 | 17.5 | 17.0 | 17.5 |
| Ex. 11 | 5.0 | 1 | 17.2 | 16.1 | 16.5 |
| Ex. 12 | 0.01 | 800 | 17.7 | 17.1 | 17.5 |

EXAMPLE 13

The positive electrode active material (80 parts by weight) obtained in Example 1, which had been adjusted to have an average particle size of about 10 μm, acetylene black (10 parts by weight) processed in a ball mill to make the average particle size of the secondary aggregate 1.0 μm, and Teflon powder (10 parts by weight) having an average particle size of the secondary aggregate of 1.0 μm which was obtained by suspension polymerization and grading, were sufficiently mixed to prepare a positive electrode product. In the same manner as in Example 1, 20 positive electrodes were produced. Percent formation of the positive electrode was 100 with no cracks or defects visually observed.

Twenty lithium batteries were fabricated in the same manner as in Example 1 by using said positive electrodes.

EXAMPLES 14, 16

In the same manner as in Example 13 except that the particle size of acetylene black and Teflon powder was varied as in Table 8, 20 positive electrodes were formed. The cracks and defects in the positive electrodes were visually examined, the results of which are shown in Table 8.

Twenty lithium batteries were fabricated in the same manner as in Example 1 by using said positive electrode.

TABLE 8

| | Average particle diameter (μm) | | | Percent formation |
| --- | --- | --- | --- | --- |
| | Positive electrode active material | Acetylene black | PTFE | |
| Ex. 13 | 10 | 1.0 | 1.0 | 100 |
| Ex. 14 | 10 | 50.0 | 50.0 | 100 |
| Ex. 15 | 10 | 0.2 | 0.2 | 90 |
| Ex. 16 | 10 | 200 | 200 | 85 |

Each of the lithium batteries fabricated in Examples 13–16 was charged with 0.5 mA constant current. Discharge and charge were repeated, and the discharge capacity was determined and plotted on a graph (FIG. 3), and also, the cycle property was determined and plotted on a graph (FIG. 4).

Figure 3:
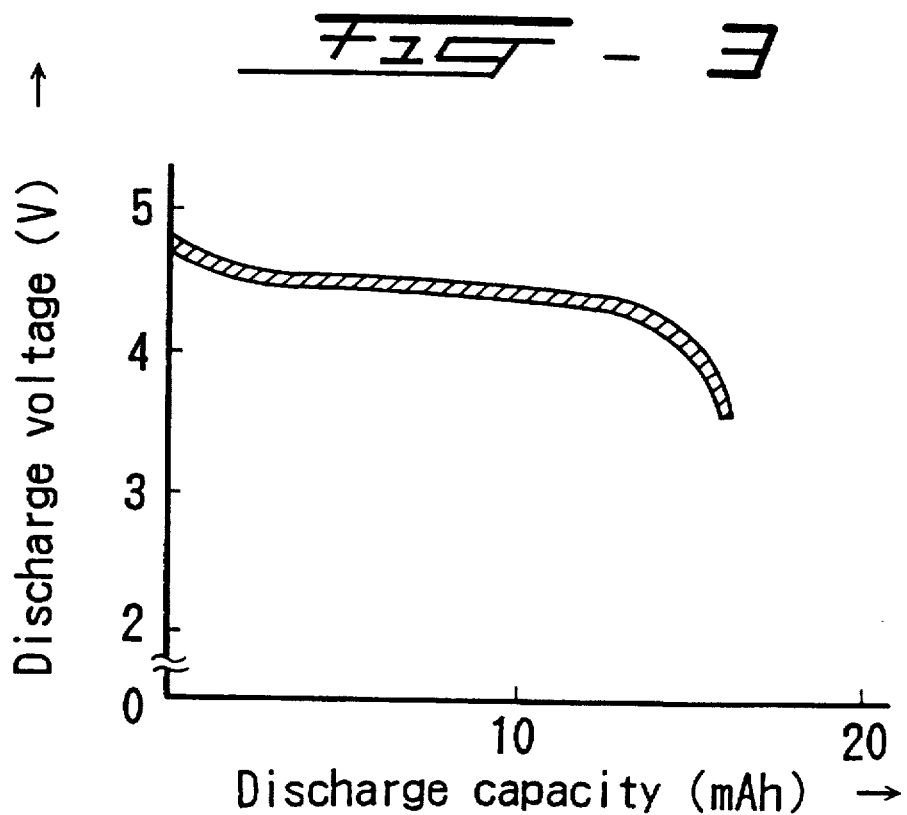
FIG. 3 is a graph showing discharge properties of a lithium secondary battery according to one embodiment of the invention.
Figure 4:
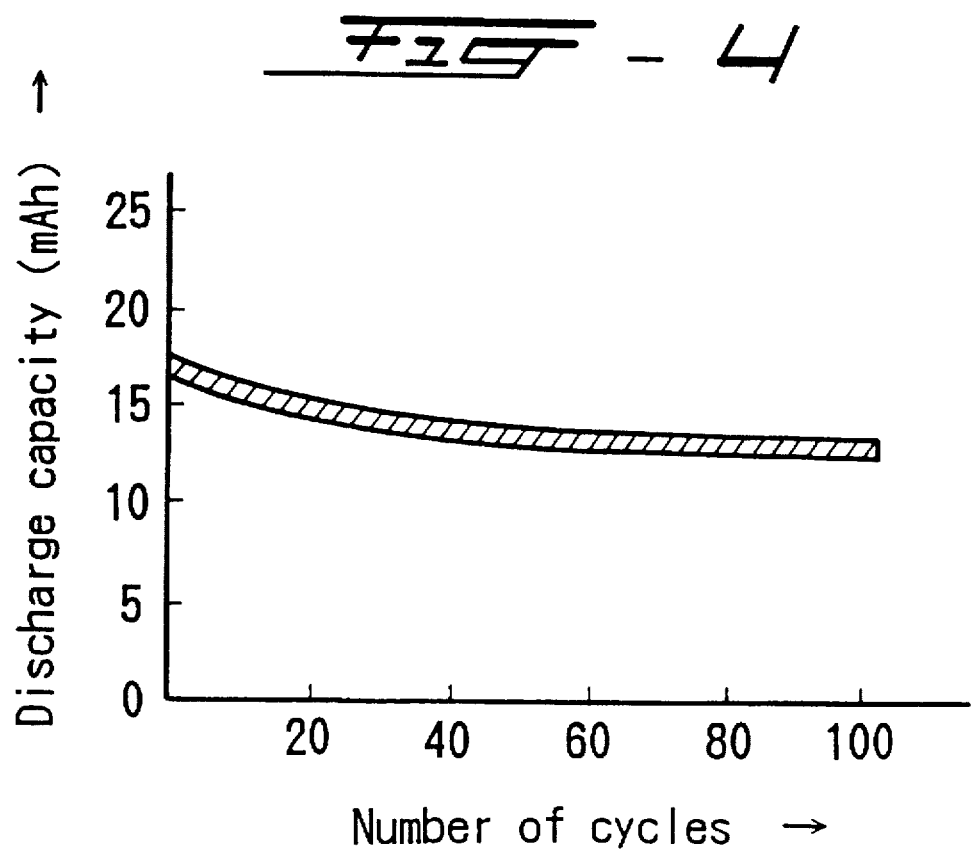
FIG. 4 is a graph showing cycle properties of a lithium secondary battery according to one embodiment of the invention.

As is evident from FIGS. 3 and 4, the lithium batteries of Examples 13–16 showed higher discharge voltage, indicating that they have high energy density with high initial discharge capacity, and are superior in cycle property.

EXAMPLE 17

Figure 5:
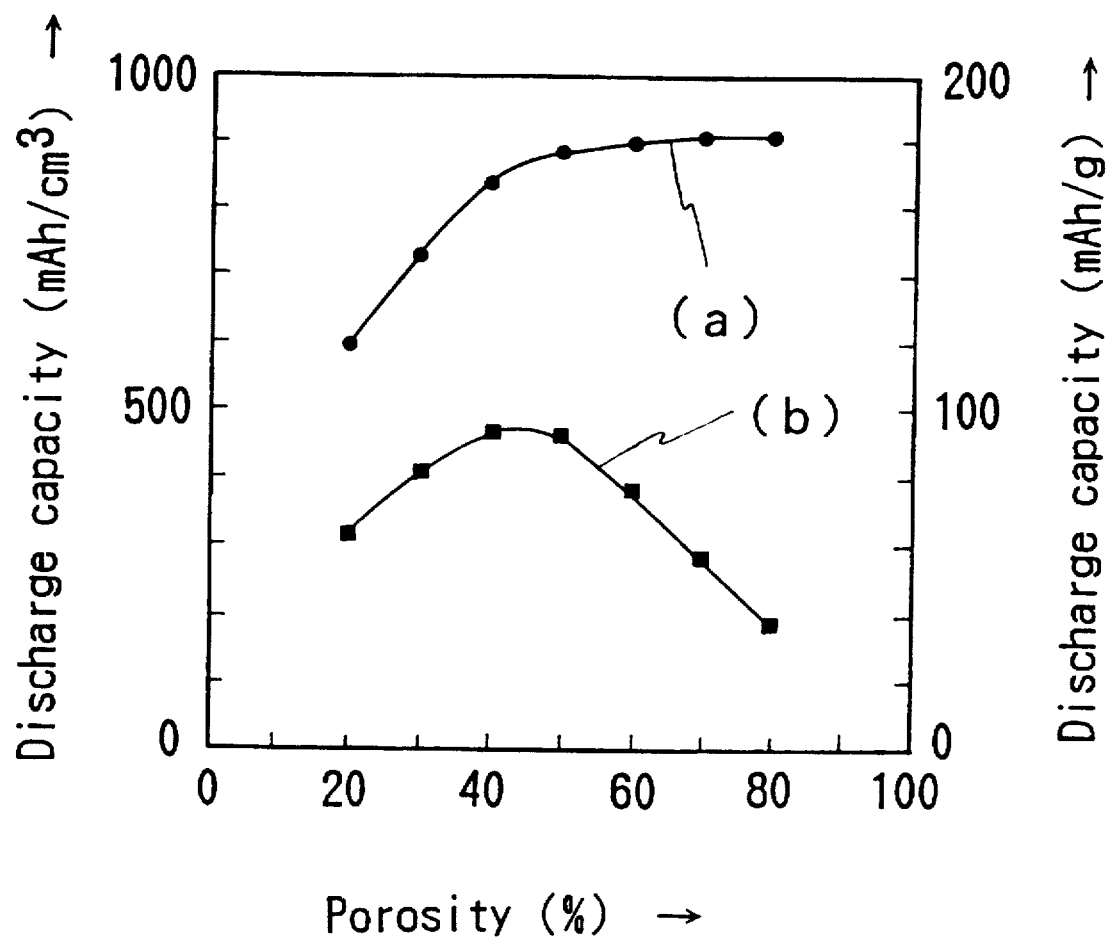
FIG. 5 is a graph showing the relationship between the porosity of the positive electrode and discharge capacity in one embodiment of the invention.

The positive electrodes obtained by press-forming as in Example 1 were further heated under varied conditions to produce positive electrodes having a porosity of not less than 20% and not greater than 80% with 10% variance. The porosity was calculated on the basis of density measured by a pychometer and bulk density. Twenty lithium batteries were fabricated, charged, repeatedly discharged and charged as described, and thereafter, discharge capacity was determined, the results of which are shown in FIG. 5.

EXAMPLE 18

A lithium battery was fabricated in the same manner as in Example 1 except that a negative electrode disc having a diameter of 20 mm, and thickness of 1.0 mm was prepared by press-forming a mixture (200 mg) of pitch coke (80 parts by weight) having a true density of 2.05 g/cm$^3$, and $d_{002}$= 3.48 Å and pulverized in a mortar into particles having a particle size of not greater than 20 µm, and Teflon (20 parts by weight) on a nickel mesh.

Figure 6:
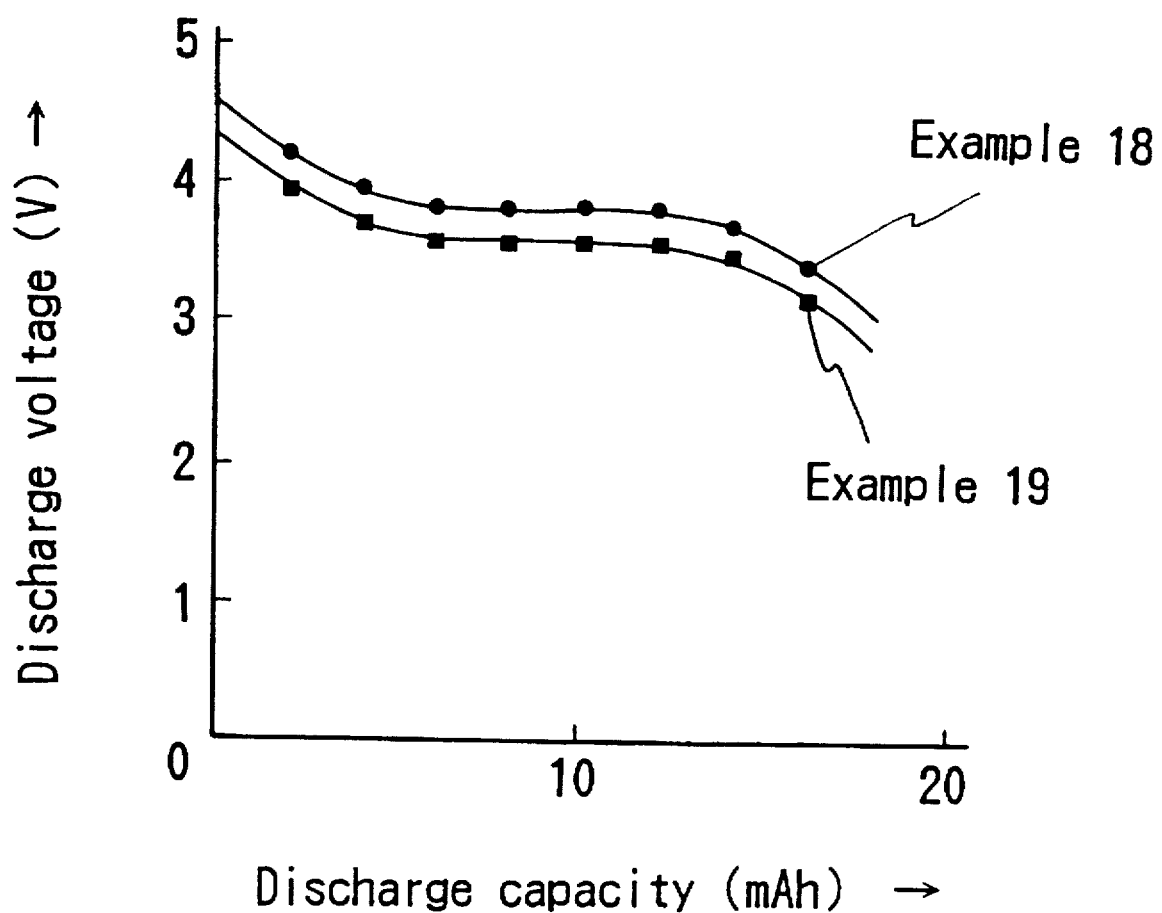
FIG. 6 is a graph showing discharge properties of lithium secondary batteries according to other embodiments of the invention.

The above lithium secondary battery was charged with 0.5 mA constant current, and repeatedly discharged and charged with upper voltage limit of 4.7 V and lower voltage limit of 2.8 V. The discharge voltage was as shown in FIG. 6. Upon 300 cycles or charge and discharge, the lithium secondary battery was disassembled to observe the negative electrode surface. As a result, no growth of dendrite or formation of a protecting film was observed. Then, the lithium secondary battery was assembled again, and 500 cycles of charge and discharge were applied, after which no abnormality was found on the negative electrode surface.

EXAMPLE 19

In the same manner as in Example 18 except that a negative electrode manufactured from fullerene ($C_{60}$) having the same structure as shown in FIG. 2 was used in place of the negative electrode of heated pitch coke, a lithium secondary battery was fabricated.

The lithium secondary battery was charged, and repeatedly discharged and charged as described. The discharge voltage was as shown in FIG. 6. Upon 300 cycles of charge and discharge, the lithium secondary battery was disassembled to observe the negative electrode surface. As a result, no growth of dendrite or formation of a protecting film was observed. Then, the lithium secondary battery was assembled again, and 500 cycles of charge and discharge were applied, after which no abnormality was found on the negative electrode surface.

EXAMPLES 20, 21

In the same manner as in Example 18 except that the positive electrode active materials prepared in Examples 2 and 3 were used, lithium secondary batteries were fabricated.

The lithium secondary batteries were charged, and repeatedly discharged and charged as in Example 1. The discharge voltage was almost the same as in Example 18.

Upon 300 cycles of charge and discharge, the lithium secondary batteries were disassembled to observe the negative electrode surface. As a result, no abnormality was found.

EXAMPLE 22

In the same manner as in Example 1 except that the following electrolysis solution was used, a lithium secondary battery was fabricated, in which case Example 1 is to be weighed as a comparative example for Example 22.

Lithium perchlorate dried in vacuum at 200° C. for 24 hours was dissolved, at a molar ratio of 1 mol/l, in a mixed organic solvent of sulfolane having a permittivity of 44 and decomposition voltage of 6 V, and which had been purified and dehydrated to a water content of not greater than 50 ppm, and 1,2-dimethoxyethane at a volume ratio of 1:1 to give an electrolysis solution.

EXAMPLES 23, 24

In the same manner as in Example 22 except that the sulfolane was used in an amount as shown in Table 9, an electrolysis solution was prepared, with which a lithium secondary battery was fabricated.

EXAMPLES 25, 26

In the same manner as in Example 22 except that the composition of the electrolysis solution was varied as shown in Table 9, lithium secondary batteries were fabricated.

The lithium secondary batteries obtained in Examples 22–26 were charged, and repeatedly discharged and charged with voltage limit of 5 V at charge, and 3 V at discharge. The pressure in the battery at the initiation of charge and discharge, upon 50 cycles thereof, and upon 100 cycles thereof was measured, the results of which are tabulated in Table 9.

TABLE 9

| | | Mixed organic solvent | Sulfolane in mixed organic solvent (% by volume) | Pressure in battery (kgf/cm$^2$) Charge-discharge cycles | | |
|---|---|---|---|---|---|---|
| | | | | 0 | 50 | 100 |
| Ex. 22 | sulfolane | 1,2-dimethoxyethane | 50 | 1.2 | 2.0 | 2.5 |
| Ex. 25 | sulfolane | diethyl carbonate | 50 | 1.2 | 2.3 | 2.9 |
| Ex. 26 | sulfolane | diethyl ether | 50 | 1.2 | 2.4 | 2.7 |
| Ex. 23 | sulfolane | 1,2-dimethoxyethane | 20 | 1.2 | 3.1 | 3.5 |
| Ex. 24 | sulfolane | 1,2-dimethoxyethane | 80 | 1.2 | 2.0 | 2.2 |

As is evident from Table 9, repeated cycles of charge-discharge of the lithium batteries did not cause increase of internal pressure.

EXAMPLE 27

In the same manner as in Example 22 except that a mixed organic solvent contained sulfolane, 1,2-dimethoxyethane, and ethylene carbonate at a volume ratio of 50:40:10, a lithium secondary was fabricated.

EXAMPLES 28–30

In the same manner as in Example 27 except that the ratio of each organic solvent was varied as shown in Table 10, lithium secondary batteries were fabricated.

The lithium secondary batteries obtained in Examples 27–30 were charged, and repeatedly discharged and charged as mentioned above. The pressure variance inside the battery upon charge and discharge, and efficiency of charge-discharge upon 50 cycles and 100 cycles based on the initial charge-discharge is as shown in Table 10.

TABLE 10

| Charge-discharge cycles | Internal pressure (kgf/cm$^2$) | | | Coulombic efficiency (%) | |
|---|---|---|---|---|---|
| | 0 | 50 | 100 | 50 | 100 |
| Ex. 27 | 1.2 | 2.0 | 2.5 | 91 | 90 |
| Ex. 28 | 1.2 | 2.5 | 2.9 | 97 | 95 |
| Ex. 29 | 1.2 | 2.2 | 2.6 | 95 | 92 |
| Ex. 30 | 1.2 | 1.8 | 2.2 | 89 | 87 |

As is evident from Table 10, repeated cycles of charge-discharge of the lithium batteries did not cause increase of internal pressure.

EXAMPLE 31

In the same manner as in Example 1 except that thiophene was added to the electrolysis solution at a ratio of 1 ml/l, a lithium battery was fabricated.

EXAMPLES 32–36

In the same manner as in Example 31 except that the kind and the ratio of the compound added to the electrolysis solution were varied as shown in Table 11, lithium batteries were fabricated.

The lithium batteries obtained in Examples 31–36 were charged, and repeatedly discharged and charged as mentioned above. The cycle property was as shown in Table 11.

TABLE 11

| Repetition cycles | Coulombic efficiency (%) | | | | | Discharge capacity (%) | | | | |
|---|---|---|---|---|---|---|---|---|---|---|
| | 1 | 50 | 100 | 200 | 300 | 1 | 50 | 100 | 200 | 300 |
| Ex. 31 | 98 | 95 | 93 | 92 | 90 | 100 | 92 | 88 | 81 | 72 |
| Ex. 32 | 100 | 98 | 97 | 95 | 92 | 100 | 97 | 94 | 88 | 76 |
| Ex. 33 | 99 | 99 | 96 | 93 | 91 | 100 | 97 | 93 | 84 | 74 |
| Ex. 34 | 99 | 96 | 96 | 94 | 90 | 100 | 94 | 92 | 86 | 73 |
| Ex. 35 | 100 | 99 | 99 | 96 | 95 | 100 | 98 | 95 | 90 | 83 |
| Ex. 36 | 100 | 97 | 96 | 94 | 93 | 100 | 96 | 93 | 87 | 79 |

As is evident from Table 11, the growth of dendrite on the lithium negative electrode was successfully suppressed even after the repeated cycles of the charge-discharge, and the batteries showed superior cycle life.

EXAMPLE 37

In the same manner as in Example 1 except that the following gel electrolyte was used in place of the electrolysis solution, a lithium battery was fabricated.

Polyvinyl alcohol (20 parts by weight) having a degree of polymerization of 1400 and a saponification ratio of 95% was dissolved in dimethyl sulfoxide (80 parts by weight). LiClO$_4$ (30 parts by weight) was added to the solution, and the mixture was stirred while heating. After an abrupt increase of viscosity due to the dissolution of the LiClO$_4$, the solution was spread in a Petri dish and left standing for about 20 hours to give a 100 μm-thick electrolyte sheet of organogel having silicone rubber behavior. A 25.0 mm-diameter disk was punched out from the solid electrolyte sheet. The impedance of the sheet was measured to examine ionic conductivity of the sheet, which was 4.5×10$^{-3}$ S/cm. This solid electrolyte also acts as a separator.

EXAMPLE 38

Polyvinyl alcohol (10 parts by weight) having a degree of polymerization of 1400 and a saponification ratio of 95%, and polyethylene oxide (1 part by weight) having a weight average molecular weight of 60,000 were dissolved in dimethyl sulfoxide (50 parts by weight). LiClO$_4$ (12 parts by weight) was added to the solution, and the mixture was stirred while heating. After an abrupt increase of viscosity due to the dissolution of the LiClO$_4$, the solution was spread in a Petri dish and left standing for about 10 hours to give an electrolyte sheet of organogel having silicone rubber behavior. The sheet was dried under reduced pressure using a vacuum pump at 60° C. for 2 hours so as to prevent exudation, and to give a 100 μm-thick sheet. A 25.0 mm-diameter solid electrolyte was punched out from the solid electrolyte sheet. The impedance of the sheet was measured to examine ionic conductivity, which was 4.0×10$^{-2}$ S/cm. This solid electrolyte also acts as a separator.

The lithium secondary batteries obtained in Examples 37 and 38 were charged, and repeatedly discharged and charged as mentioned above. The cycle property was as shown in Table 12.

TABLE 12

| Repetition cycles | Coulombic efficiency (%) | | | | | Discharge capacity (%) | | | | |
|---|---|---|---|---|---|---|---|---|---|---|
| | 1 | 50 | 100 | 200 | 300 | 1 | 50 | 100 | 200 | 300 |
| Ex. 37 | 95 | 94 | 94 | 92 | 90 | 100 | 93 | 88 | 83 | 75 |
| Ex. 38 | 95 | 94 | 93 | 91 | 90 | 100 | 90 | 85 | 80 | 76 |

As is evident from Table 12, repeated cycles of charge-discharge of the lithium batteries were not detrimental to the superior cycle life of the batteries.

The present invention has been detailedly described in the foregoing in which it was made clear that a positive electrode with high electromotive force and high capacity obtainable by the present invention is conducive to a lithium secondary battery with a high energy density as a result of the increased intercalation of Li ion per unit volume and weight of the positive electrode.

The uniform pores formed in the positive electrode can prevent irregular discharge voltage, as well as cracks and defects, by the improved forming property into the positive electrode.

In addition, the use of a specific carbon negative electrode corresponding to the positive electrode leads to no occurrence of dendrite, which permits provision of a lithium secondary battery superior in cycle life with little decrease in discharge capacity upon repeated cycles of charge and discharge.

Also, the use of a mixed solvent of at least sulfolane and/or ethylene carbonate, and a low-viscosity organic solvent as an electrolysis solution in the present invention permits provision of a lithium secondary battery superior in cycle life in that the electrolyte is not decomposed by the high voltage during charging of the battery.

In the present invention, an electrolysis solution comprising an unsaturated heterocyclic compound, an aromatic hydrocarbon, or a saturated cyclic hydrocarbon is used so that occurrence of dendrite is drastically suppressed even when negative electrode is a lithium electrode, thus preventing degradation of the negative electrode and internal short-circuit, whereby to afford a lithium secondary battery having a superior cycle life.

To conclude, a lithium secondary battery having high energy density affording high electromotive force and high discharge voltage, and superior cycle life can be provided by the present invention.

What is claimed is:

1. A lithium secondary battery comprising a positive electrode composed of a positive electrode active material consisting essentially of lithium phosphate, lithium-cobalt phosphate, cobalt oxide, and lithium-cobalt oxide, wherein the molar ratio of cobalt:phosphorus:lithium is 0.2–1.75:0.25–1.8:1, a negative electrode, and an electrolyte.

2. The lithium secondary battery of claim 1 wherein the positive electrode active material is an amorphous positive electrode active material.

3. The lithium secondary battery of claim 1 wherein the positive electrode active material is a positive electrode active material having an average particle size of 0.01–20 µm.

4. The lithium secondary battery of claim 1 wherein the positive electrode active material is a positive electrode active material having a BET specific surface area of 1–1000 $m^2/g$.

5. The lithium secondary battery of claim 1 wherein the positive electrode is a positive electrode composed of the positive electrode active material of claim 2, a binder and an electrical conducting agent respectively having a particle size of 0.02–20 times that of the positive electrode active material.

6. The lithium secondary battery of claim 1 wherein the positive electrode is a positive electrode having a porosity of 25–60%.

7. The lithium secondary battery of claim 1, wherein the negative electrode is a negative electrode prepared by forming a lithium ion-conductive polymer film on the surface of a lithium or lithium alloy electrode by the plasma CVD method.

8. The lithium secondary battery of claim 1, wherein the negative electrode is a lithium negative electrode having an electrodeposition layer of lithium ion and a metal alloyed with lithium on the surface of the electrode.

9. The lithium secondary battery of claim 1, wherein the negative electrode is a carbon negative electrode composed of at least one member selected from the group consisting of a hollow carbon molecular structure of the molecular formula: Cn ($n \geq 60$), a carbonized organic member having a $d_{002}$ of not less than 3.37 Å by X-ray analysis and graphite.

10. The lithium secondary battery of claim 1, wherein the negative electrode is a lithium or lithium alloy negative electrode, and the electrolyte is an electrolysis solution comprising at least one member selected from the group consisting of an unsaturated heterocyclic compound, an aromatic hydrocarbon, and a saturated cyclic hydrocarbon at a ratio of 0.1–10 ml/l.

11. The lithium secondary battery of claim 1, wherein the electrolyte is an electrolysis solution comprising sulfolane and/or ethylene carbonate, and a low-viscosity organic solvent.

12. The lithium secondary battery of claim 1, wherein the electrolyte is a solid electrolyte composed of an electrolyte-containing polymer.

13. The lithium secondary battery of claim 1, wherein the electrolyte is a solid electrolyte composed of an electrolyte-containing porous body having an average pore diameter of not greater than 50 µm which is composed of a crosslinked polymer containing polar units.

14. The lithium secondary battery of claim 1, wherein the electrolyte is a gel electrolyte composed of an organogel containing an electrolyte.

* * * * *